United States Patent [19]

Tanaka et al.

[11] Patent Number: 5,363,272
[45] Date of Patent: Nov. 8, 1994

[54] CAPACITOR APPARATUS INCORPORATING FUSE

[75] Inventors: Eisaku Tanaka, Kameoka; Choujirou Kuriyama, Kyoto, both of Japan

[73] Assignee: Rohm Co., Ltd., Kyoto, Japan

[21] Appl. No.: 797,006

[22] Filed: Nov. 25, 1991

[30] Foreign Application Priority Data

Nov. 26, 1990 [JP] Japan .................................. 2-324124

[51] Int. Cl.$^5$ .............................................. H01G 1/10
[52] U.S. Cl. .................................. 361/534; 361/275.4
[58] Field of Search ............................... 361/534–540, 361/275, 275.4; 337/228, 297

[56] References Cited

U.S. PATENT DOCUMENTS

| | | | |
|---|---|---|---|
| 3,805,208 | 4/1974 | McAlister | 337/228 |
| 4,107,762 | 8/1978 | Shirn et al. | 361/534 |
| 4,121,277 | 10/1978 | Hilbert | 361/534 |
| 4,296,398 | 10/1981 | McGalliard | 337/297 |
| 4,581,681 | 4/1986 | Feilhauer | 361/275 |
| 4,935,848 | 6/1990 | Yamane et al. | 361/534 |

FOREIGN PATENT DOCUMENTS 0306809  3/1989  European Pat. Off. .

OTHER PUBLICATIONS

IBM Technical Disclosure Bulletin, vol. 25, No. 8 (Jan. 1983).
Abstract of Japanese Patent No. 91120088.9.

*Primary Examiner*—Bruce A. Reynolds
*Assistant Examiner*—Michael D. Switzer
*Attorney, Agent, or Firm*—Nikaido, Marmelstein, Murray & Oram

[57] ABSTRACT

A capacitor apparatus incorporating a fuse incorporates a capacitor device having a first electrode and a second electrode; a fuse whose one end is connected to the first electrode; a first lead terminal connected to the other end of the fuse; a second lead terminal connected to the second electrode; and resin in which the capacitor device, fuse, and a part of the first and second lead terminals are molded. According to such features, fuming and ignition of the capacitor device due to an excessive current therethrough can be prevented without fail.

11 Claims, 2 Drawing Sheets

CAPACITOR APPARATUS INCORPORATING FUSE

BACKGROUND OF THE INVENTION

1. Field of the Invention

The present invention relates to a capacitor apparatus, and more particularly, to a capacitor apparatus incorporating a fuse.

2. Description of the Prior Art

A tantalum capacitor apparatus has conventionally been used where a fuse is incorporated to prevent fuming and ignition of the tantalum capacitor due to an excessive electric current and to prevent a peripheral circuit from catching fire from the tantalum capacitor apparatus. A capacitor apparatus of this type is constructed by molding a capacitor device and a fuse in resin 3. A plus electrode of the capacitor device is connected to a first lead terminal. A minus electrode thereof is connected to a second lead terminal through the fuse. The fuse employed for the capacitor apparatus is either a cylindrical type with a diameter $\Phi$ of 0.12 mm as shown in FIG. 1 or a type with a width w of from 0.5 mm to 1.0 mm and a thickness t of from 0.05 mm to 0.07 mm as shown in FIG. 2.

In the above-described conventional capacitor apparatus having a fuse where a cylindrical or band-shaped fuse is used, it takes a long time for the fuse to melt when an excessive current flows therethrough, so that there is still a possibility that fuming and ignition of the capacitor apparatus will occur.

SUMMARY OF THE INVENTION

An object of the present invention is to provide a capacitor apparatus incorporating a fuse where the fuse immediately melts when an excessive current flows therethrough and where fuming and ignition of the capacitor can sufficiently be prevented.

In accordance with this object, a capacitor apparatus according to the present invention is provided with: a capacitor device having a first electrode and a second electrode: a fuse whose one end is connected to the first electrode; a first lead terminal connected to the other end of the fuse; a second lead terminal connected to the second electrode: and resin in which the capacitor device, fuse, and a part of the first and second lead terminals are molded. And, both ends of said fuse are wide and a central portion thereof is narrow.

BRIEF DESCRIPTION OF THE DRAWINGS

The above and other objects and features of this invention will become clear from the following description taken in conjunction with the preferred embodiments with reference to the accompanying drawings in which.

DETAILED DESCRIPTION OF THE PREFERRED EMBODIMENT

Figure 1:
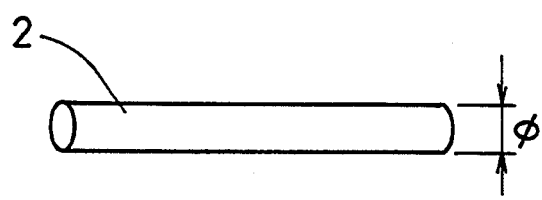
FIG. 1 is a perspective view of a fuse employed for a conventional capacitor apparatus incorporating a fuse.
Figure 2:
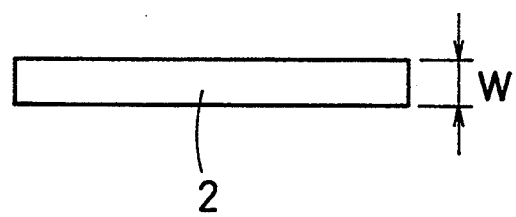
FIG. 2 is a perspective view of another fuse employed for a conventional capacitor apparatus.
Figure 3:
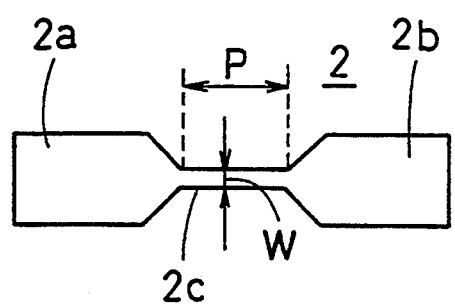
FIG. 3 is a plan view of a fuse employed for an embodiment of the present invention.
Figure 4:
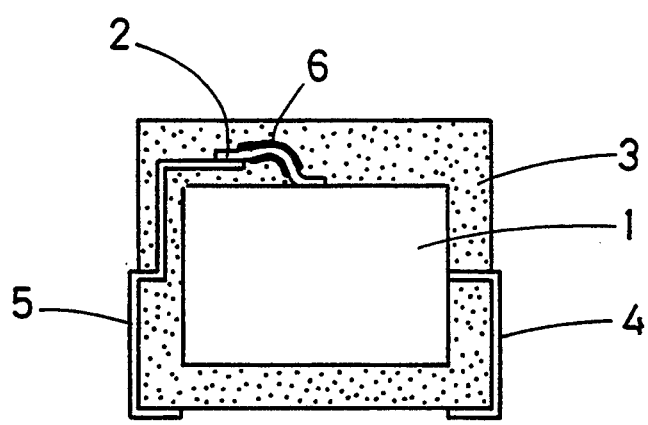
FIG. 4 is a cross-sectional view of a part of a capacitor apparatus which is an embodiment of the present invention.

In this embodiment, as shown in FIG. 4, one end of a fuse 2 is connected to a minus electrode which forms periphery of the capacitor device 1. The other end of the fuse is connected to a lead terminal 5 which is provided separately from a lead terminal 4 connected to a plus electrode of a capacitor device 1. While both of end portions 2a and 2b of the fuse 2 are comparatively wide as shown in FIG. 3, a central portion 2c thereof is very thin; a width W1 thereof is 0.01 mm within a range P.

Because of this, current density is high at the central portion 2c, so that the fuse 2 easily melts. The wide end portions 2a and 2b enable easy connection and reduce resistance at connection portions. The end portion 2a is connected to the lead terminal 5. The end portion 2b is connected to the minus electrode of the capacitor device 1.

The fuse 2 is made of an alloy of lead, tin, and silver. A melting point thereof is comparatively high. This characteristic is advantageous in bringing a current carrying capacity of the fuse 2 as close to that at which the capacitor device 1 is broken as possible. The fuse 2 has a thin, plate-like shape. Its shape and the fact that the fuse 2 is made of the above-described alloy provide flexibility to the fuse 2. Hence, when there is a difference in height between two connection portions as shown in FIG. 4, the fuse 2 can be bent into an appropriate form to be connected.

All the above-described members of the capacitor apparatus other than a part of the lead terminals 4 and 5 are molded in epoxy resin 3. Silicone resin 6 is applied to a periphery of the fuse 2. The silicone resin 6 is applied to the fuse 2 before the members are molded in the epoxy resin 3. The silicone resin 6 is applied so as to surround at least the central portion 2c.

Applying the resin 6 as described above makes melting of the fuse 2 easier. That is, at a temperature at which the central portion 2c of the fuse 2 melts, the resin 6 melts and a volume thereof decreases to decrease a space occupied by the resin 6. Consequently, the melted fuse is more easily dispersed, which helps the melting of the fuse 2.

As described above, according to the present invention, since the thin portion provided on the central portion 2c immediately melts when a current value of the current flowing therethrough becomes a predetermined excessive current value, fuming and ignition of the capacitor device can be prevented without failure.

Figure 5:
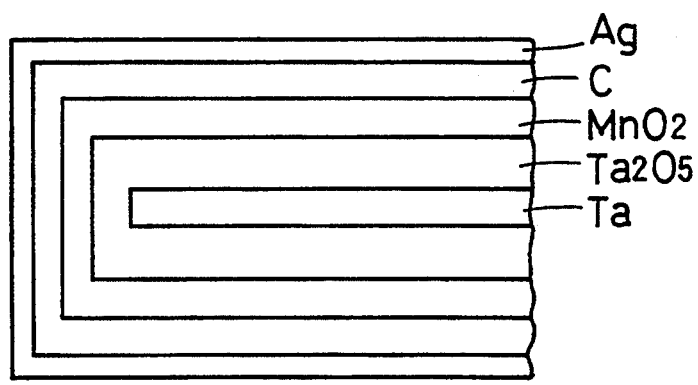
FIG. 5 is a structural and cross-sectional view of a tantalum capacitor employed for the embodiment.

FIG. 5 schematically shows a structure of a tantalum capacitor which is an embodiment of the capacitor device 1. The tantalum capacitor consists of, from the center to the periphery, tantalum (Ta) constituting the plus electrode, tantalum pentoxide ($Ta_2O_5$) forming a dielectric layer, manganese dioxide ($MnO_2$), carbon (C), and silver (Ag). The layers of manganese dioxide, carbon, and silver constitute the minus electrode. The silver layer forms the periphery, to which the end portion 2a of the fuse 2 is connected.

Obviously, many modifications and variations of the present invention are possible in light of the above teachings. It is therefore to be understood that within the scope of the appended claims, the invention may be practiced other than as specifically described.

What is claimed is:

1. A capacitor apparatus incorporating a fuse comprising:
    a capacitor device having a first electrode and a second electrode;
    a fuse having a first end connected to the first electrode;
    a first lead terminal connected to a second end of said fuse;
    a second lead terminal connected to the second electrode;
    a resin body in which said capacitor device, fuse, and inner end portions of said first and second lead terminals are enclosably molded therein, said fuse being formed such that first and second end portions of said fuse are wide and a central portion thereof is narrow relative to each other; and
    an inner resin applied to a periphery of the central portion of said fuse and formed so as to not extend to said first lead terminal, said inner resin being further formed to melt at least at a predetermined temperature at which said fuse melts, the predetermined temperature being produced by said fuse when excess current passes therethrough.

2. A capacitor apparatus according to claim 1, wherein said fuse is made of an alloy of lead, tin, and silver.

3. A capacitor apparatus according to claim 1, wherein said capacitor device is a tantalum capacitor having a plus electrode is provided in a center thereof and a minus electrode at a periphery thereof, and one end of said fuse is connected to the minus electrode.

4. A capacitor apparatus according to claim 1, wherein said fuse is flexible and has a thin, plate-like shape.

5. A capacitor apparatus incorporating a fuse comprising:
    a capacitor device having a first electrode and a second electrode;
    a fuse with a first end connected to the first electrode, said fuse being formed such that first and second end portions of said fuse are wide and a central portion thereof is narrow relative to each other;
    a first lead terminal connected to a second end of said fuse;
    a second lead terminal connected to the second electrode;
    a first resin applied to a periphery of the central portion of said fuse and formed so as to not extend to said first lead terminal, said first resin being further formed to melt at least at a predetermined temperature at which said fuse melts, the predetermined temperature being produced by said fuse when excess current passes therethrough; and
    a second resin formed so as to not melt at the predetermined temperature, said second resin being further formed such that said capacitor device, fuse, first resin, and inner end portions of said first and second lead terminals are enclosably molded therein.

6. A capacitor apparatus according to claim 5, wherein said first resin is silicone resin and said second resin is epoxy resin.

7. A capacitor apparatus according to claim 5, wherein said capacitor device is a tantalum capacitor having a plus electrode is provided in a center thereof and a minus electrode at a periphery thereof, and one end of said fuse is connected to the minus electrode.

8. A capacitor apparatus according to claim 5, wherein said fuse is flexible and has a thin, plate-like shape.

9. A capacitor apparatus according to claim 5, wherein said first resin is applied to a periphery of the central portion.

10. A capacitor apparatus incorporating a fuse comprising:
    a capacitor device having a first electrode and a second electrode;
    a fuse with a first end connected to the first electrode, said fuse being formed such that first and second end portions of said fuse are wide and a central portion thereof is narrow relative to each other;
    a first lead terminal connected to a second end of said fuse;
    a second lead terminal connected to the second electrode;
    a first resin applied to a periphery of the central of said fuse and formed so as to not extend to said first lead terminal, said first resin being further formed to contract at a predetermined temperature produced by said fuse when excess current passes therethrough such that said fuse melts; and
    a second resin formed so as to not melt at the predetermined temperature, said second resin being further formed such that said capacitor device, fuse, first resin, and inner end portions of said first and second lead terminals are enclosably molded therein, wherein said first resin is not in contact with the first lead terminal and the second electrode.

11. A capacitor apparatus incorporating a fuse comprising:
    a capacitor device having a first electrode and a second electrode;
    a fuse with a first end connected to the first electrode, said fuse being formed such that first and second end portions of said fuse are wide and a central portion thereof is narrow relative to each other;
    a first lead terminal connected to a second end of said fuse;
    a second lead terminal connected to the second electrode;
    a first resin applied to a periphery of the central portion of said fuse and formed so as to not extend to said first lead terminal, said first resin being further formed to contract at a predetermined temperature produced by said fuse when excess current passes therethrough such that said fuse melts; and
    a second resin formed so as to not melt at the predetermined temperature, said second resin being further formed such that said capacitor device, fuse, first resin, and inner end portions of said first and second lead terminals are enclosably molded therein, wherein said first lead terminal is connected to the second end of said fuse at a position above the second electrode.

* * * * *